United States Patent
Kawano

(10) Patent No.: US 9,577,941 B2
(45) Date of Patent: Feb. 21, 2017

(54) CONTROLLER, METHOD FOR DISTRIBUTING LOAD, NON-TRANSITORY COMPUTER-READABLE MEDIUM STORING PROGRAM, COMPUTER SYSTEM, AND CONTROL DEVICE

(71) Applicant: Shotaro Kawano, Tokyo (JP)

(72) Inventor: Shotaro Kawano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 19 days.

(21) Appl. No.: 14/372,619

(22) PCT Filed: Oct. 31, 2012

(86) PCT No.: PCT/JP2012/006998
§ 371 (c)(1),
(2) Date: Jul. 16, 2014

(87) PCT Pub. No.: WO2013/114490
PCT Pub. Date: Aug. 8, 2013

(65) Prior Publication Data
US 2014/0355448 A1    Dec. 4, 2014

(30) Foreign Application Priority Data
Feb. 2, 2012    (JP) .................. 2012-020695

(51) Int. Cl.
*H04L 12/729* (2013.01)
*H04L 12/771* (2013.01)
(Continued)

(52) U.S. Cl.
CPC ............. *H04L 47/125* (2013.01); *H04L 45/58* (2013.01); *H04L 45/64* (2013.01); *H04L 47/19* (2013.01)

(58) Field of Classification Search
CPC .... H04L 45/38; H04L 45/021; H04L 47/2441; H04L 45/125; H04L 46/64; H04L 45/56; H04L 47/19
See application file for complete search history.

(56) References Cited

U.S. PATENT DOCUMENTS

| | | | |
|---|---|---|---|
| 8,593,958 B2* | 11/2013 | Zhang | H04L 43/026 370/230.1 |
| 8,861,359 B2* | 10/2014 | Sugita | G06F 9/505 370/235 |
| 2012/0020361 A1 | 1/2012 | Ueno | |

FOREIGN PATENT DOCUMENTS

| | | |
|---|---|---|
| JP | 2010-45502 A | 2/2010 |
| JP | 2011-166692 A | 8/2011 |

(Continued)

OTHER PUBLICATIONS

International Search Report (ISR) (PCT Form PCT/ISA/210), in PCT/JP2012/006998, dated Dec. 4, 2012.
(Continued)

*Primary Examiner* — Ayaz Sheikh
*Assistant Examiner* — Debebe Asefa
(74) *Attorney, Agent, or Firm* — McGinn IP Law Group, PLLC.

(57) ABSTRACT

An OpenFlow network includes multiple controllers. Each controller includes a load control table and a load control unit. The load control table controls at least one of the number of messages which each of switches in the Open-Flow network has transmitted to a controller controlling the switch over a predetermined time and the number of packets that the switch has received over a predetermined time. When a predetermined event occurs, the load control unit detects a controller having a processing load higher than or equal to a first threshold on the basis of the load control table and places at least one of the switches controlled by the detected controller under the control of another controller.

23 Claims, 16 Drawing Sheets

(51) Int. Cl.
  *H04L 12/801*  (2013.01)
  *H04L 12/803*  (2013.01)
  *H04L 12/715*  (2013.01)
  *H04L 12/775*  (2013.01)

(56) References Cited

FOREIGN PATENT DOCUMENTS

| JP | 2011-170718 A | 9/2011 |
| JP | 2013-105308 A | 5/2013 |
| WO | WO 2011/065268 A1 | 6/2011 |
| WO | WO 2011/074516 A1 | 6/2011 |

OTHER PUBLICATIONS

OpenFlow Switch Specification Version 1.1.0 Implemented (Wire Protocol 0x02) Feb. 28, 2011, [retrieved on Jan. 16, 2012], Internet <URL: http://www.openflow.org/documents/openflow-spec-v1.1.0.pdf>.

Extended European Search Report dated Jul. 22, 2015.

"OpenFlow Switch Specification", Dec. 5, 2011, XP055177510,. Retrieved from the Internet: URL: http://www.opennetworking.org/images/stories/downloads/sdn-resourses/onf-specifications/openflow/openflow-spec-v1.2.pdf Appendix A.

Japanese Decision to Grant a Patent dated Jul. 14, 2015 with a partial English translation thereof.

Chinese Office Action dated May 9, 2016 with an English translation.

* cited by examiner

| SWITCH ID | CONTROLLER ID | HOP COUNT | RECEIVED MESSAGE COUNT | RECEIVED PACKET COUNT |
|---|---|---|---|---|
| SWITCH A | CONTROLLER A | 1 | 30 | 100 |
| SWITCH B | CONTROLLER A | 2 | 20 | 200 |
| SWITCH C | CONTROLLER A | 1 | 5 | 100 |
| SWITCH D | CONTROLLER B | 1 | 30 | 200 |
| --- | --- | --- | --- | --- |

Fig. 3

| SWITCH ID | CONTROLLER ID | HOP COUNT | RECEIVED MESSAGE COUNT | RECEIVED PACKET COUNT |
|---|---|---|---|---|
| SWITCH A | CONTROLLER A | 1 | 30 | 100 |
| SWITCH B | CONTROLLER A | 2 | 20 | 200 |
| SWITCH C | CONTROLLER B | 2 | 5 | 100 |
| SWITCH D | CONTROLLER B | 1 | 30 | 200 |
| SWITCH E | CONTROLLER B | 2 | 15 | 100 |
| SWITCH F | CONTROLLER B | 2 | 20 | 100 |

Fig. 12

| SWITCH ID | CONTROLLER ID | HOP COUNT | RECEIVED MESSAGE COUNT | RECEIVED PACKET COUNT |
|---|---|---|---|---|
| SWITCH A | CONTROLLER A | 1 | 30 | 100 |
| SWITCH B | CONTROLLER A | 2 | 20 | 200 |
| SWITCH C | CONTROLLER A | 2 | 5 | 100 |
| SWITCH D | CONTROLLER B | 1 | 30 | 200 |
| SWITCH E | CONTROLLER B | 2 | 15 | 100 |
| SWITCH F | CONTROLLER B | 2 | 20 | 100 |

Fig. 13

CONTROLLER, METHOD FOR DISTRIBUTING LOAD, NON-TRANSITORY COMPUTER-READABLE MEDIUM STORING PROGRAM, COMPUTER SYSTEM, AND CONTROL DEVICE

TECHNICAL FIELD

The present invention relates to a controller, a method for distributing a load, a non-transitory computer-readable medium storing a program, a computer system, and a control device. In particular, the invention relates to a controller, a method for distributing a load, a non-transitory computer-readable medium storing a program, a computer system, and a control device related to an OpenFlow network.

BACKGROUND ART

An OpenFlow network is a network control technology that defines, as a "flow," a series of communications determined by a combination of a Media Access Control (MAC) address, an IP address, and a port number and performs path control for each flow. An OpenFlow network includes a controller for computing the path of a packet (OFC: OpenFlow controller), switches for forwarding a packet (OFS: OpenFlow switches), and terminals connected to the switches.

Each switch includes a flow table in which packet forwarding paths, packet forwarding methods, and the like are described for each flow. The controller sets packet forwarding rules in the entries of the flow tables of the switches. Each switch forwards a packet in accordance with the forwarding rules set in the flow table.

The controller and the switches are connected via the Secure Socket Layer/Transport Layer Security (SSL/TLS), called a secure channel, or Transmission Control Protocol (TCP). OpenFlow protocol messages are transmitted or received via a secure channel.

When a switch receives a packet from a terminal, the switch refers to the header fields (header field attributes) of the flow table and searches for an entry having a header field matching the header information of the packet. If such an entry exists, the switch updates statistical information ("Counters" attribute) of the entry and performs a designated process ("Actions" attribute). If no such entry exists, the switch transmits the packet to the controller (packet-in message).

The controller receives the packet-in message and computes the path of the packet. The controller then adds an entry corresponding to the packet to the flow table of the switch on the basis of the computed path (flow-mod message). The controller then transmits the packet to the switch (packet-out message).

If more terminals are connected to the switches in the OpenFlow network, the switches transmit more packet-in messages to the controller. In this case, the single controller may not be able to process the messages. For this reason, it is preferable to install multiple controllers in the OpenFlow network so that the messages the controller receives from the switches are distributed.

In the installation of multiple controllers in the OpenFlow network, each controller is assigned switches to be controlled by the controller. Accordingly, each controller transmits or receives messages to or from only the switches to be controlled thereby. As a result, it is possible to distribute the messages the controllers receives from the switches.

Assuming that multiple controllers are installed in the OpenFlow network, each controller requires path information and topology information described below when setting forwarding rules in the flow table of each switch. For this reason, the controllers synchronize these sets of information with one another.

(1) Path Information

Path information is information indicating the shortest path in the OpenFlow network. Each controller computes path information from topology information.

(2) Topology Information

Topology information is information on the connection of a switch in the OpenFlow network. Each controller acquires topology information on each of switches controlled by the controller by periodically transmitting query packets of the Link Layer Discovery Protocol (LLDP) or the like to the switches.

CITATION LIST

Patent Literature

[Patent Literature 1] Japanese Unexamined Patent Application Publication No. 2011-166692

Non Patent Literature

[Non-Patent Literature 1] OpenFlow Switch Specification Version 1.1.0 Implemented (Wire Protocol 0x02) Feb. 28, 2011, [retrieved on Jan. 16, 2012], Internet <URL: http://www.openflow.org/documents/openflow-spec-v1.1.0.pdf>

SUMMARY OF INVENTION

Technical Problem

As described above, it is possible to install multiple controllers in the OpenFlow network and thus to distribute the loads of the controllers. However, simply assigning approximately the same number of switches to each controller does not allow the loads of the controllers to be balanced. There are the following reasons (1) and (2) for this.

(1) Use State of Switch

The number of messages that a switch controlled by a controller transmits to the controller varies among switches. The number of messages also varies with the time zone.

(2) Update of Network Configuration (Topology)

The number of messages that a switch controlled by a controller transmits to the controller varies with a change in topology caused by a connection failure between switches, addition or deletion of a switch, or the like.

The present invention has been made in the view of the above problem, and a principal object thereof is to provide a controller, a method for distributing a load, a non-transitory computer-readable medium storing a program, a computer system, and a control device which, in an OpenFlow network including multiple controllers, can balance the loads of the controllers.

Solution to Problem

According to an aspect of the present invention, a controller for controlling some of a plurality of switches in an OpenFlow network, the controller comprising:

a load control table configured to control at least one of the number of messages which each of the switches in the OpenFlow network has transmitted to a controller controlling the switch over a predetermined time and the number of packets which the switch has received over a predetermined time; and load control means configured to, when a predetermined event occurs, detect a controller whose processing load should be distributed, on the basis of the load control table and to place at least one of switches controlled by the detected controller under the control of another controller.

According to an aspect of the present invention, a method for distributing a load of a controller, the controller controlling some of a plurality of switches in an OpenFlow network, the method comprising:

a control step of controlling a load control table including at least one of the number of messages which each of the switches in the OpenFlow network has transmitted to a controller controlling the switch over a predetermined time and the number of packets which the switch has received over a predetermined time; and a load control step of, when a predetermined event occurs, detecting a controller whose processing load should be distributed, on the basis of the load control table and placing at least one of switches controlled by the detected controller under the control of another controller.

According to an aspect of the present invention, a non-transitory computer-readable medium storing a program for causing a computer to execute a method for distributing a load of a controller, the controller controlling some of a plurality of switches in an OpenFlow network, the method comprising:

a control step of controlling a load control table including at least one of the number of messages which each of the switches in the OpenFlow network has transmitted to a controller controlling the switch over a predetermined time and the number of packets which the switch has received over a predetermined time; and a load control step of, when a predetermined event occurs, detecting a controller whose processing load should be distributed on the basis of the load control table and placing at least one of switches controlled by the detected controller under the control of another controller.

According to an aspect of the present invention, a computer system comprising:

a plurality of switches each configured to forward a packet in an OpenFlow network on the basis of a flow table; and a plurality of controllers each configured to control some of the switches, wherein each of the controllers comprises:

a load control table configured to control at least one of the number of messages which each of the switches in the OpenFlow network has transmitted to a controller controlling the switch over a predetermined time and the number of packets which the switch has received over a predetermined time; and load control means configured to, when a predetermined event occurs, detect a controller whose processing load should be distributed on the basis of the load control table and to place at least one of switches controlled by the detected controller under the control of another controller.

According to an aspect of the present invention, a control device for distributing loads of a plurality of controllers, the controllers controlling switches in an OpenFlow network, the control device comprising:

a load control table configured to control at least one of the number of messages which each of the switches in the OpenFlow network has transmitted to a controller controlling the switch over a predetermined time and the number of packets which the switch has received over a predetermined time; and load control means configured to, when a predetermined event occurs, detect a controller whose processing load should be distributed on the basis of the load control table and to place at least one of switches controlled by the detected controller under the control of another controller.

Advantageous Effects of Invention

According to the present invention, it is possible to provide a controller, a method for distributing a load, a non-transitory computer-readable medium storing a program, a computer system, and a control device which, in an OpenFlow network including multiple controllers, can balance the loads of the controllers.

BRIEF DESCRIPTION OF DRAWINGS

FIG. 3 is a conceptual diagram showing the configuration of a load control table according to the first embodiment;

FIG. 12 shows an example configuration of the load control table according to the first embodiment;

FIG. 13 shows an example configuration of the load control table according to the first embodiment;

DESCRIPTION OF EMBODIMENTS

First Embodiment

Figure 1:
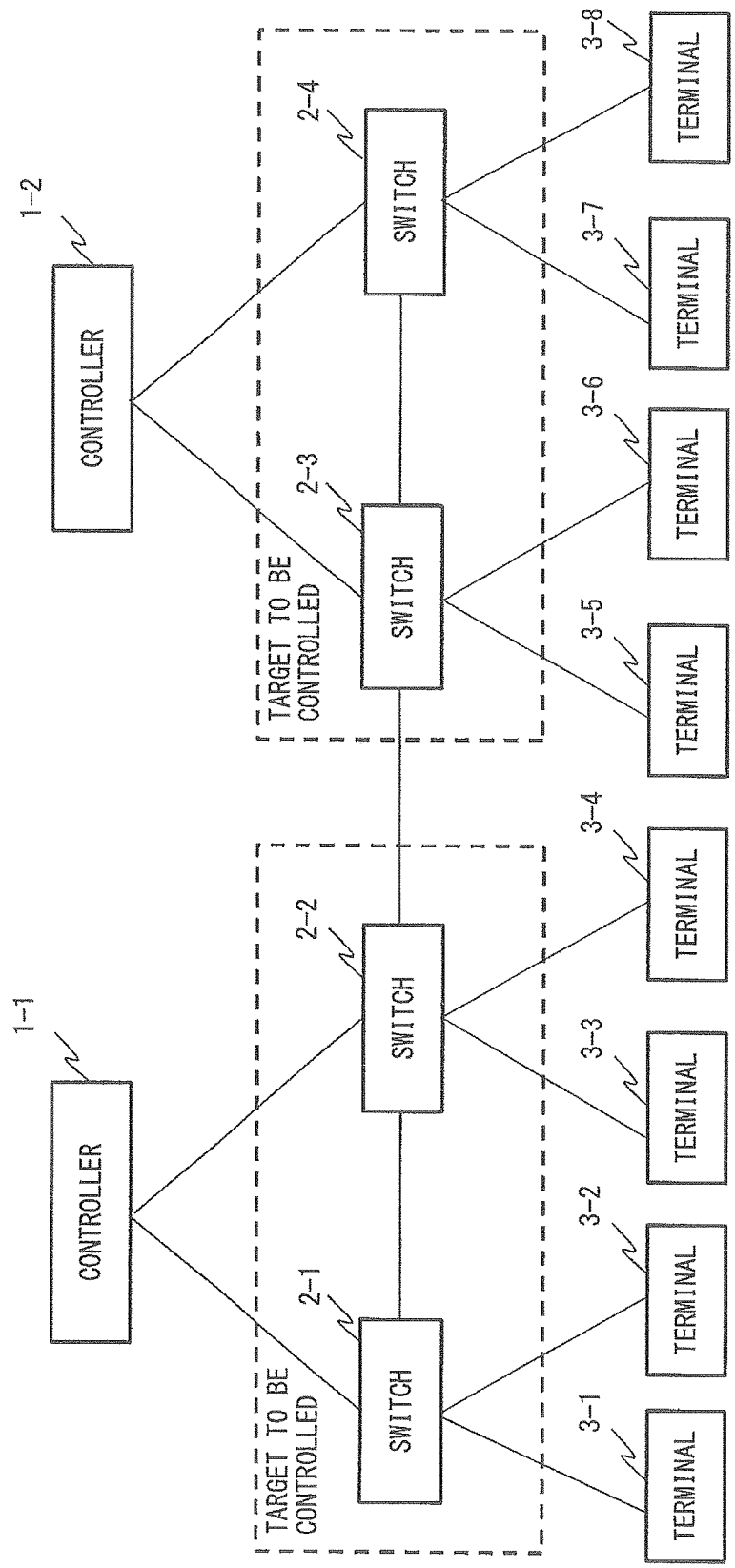
FIG. 1 is a block diagram showing the configuration of an OpenFlow network according to a first embodiment.

Now, an embodiment of the present invention will be described with reference to the drawings. First, an OpenFlow network according to the present embodiment will be outlined. FIG. 1 is a block diagram showing the configuration of the OpenFlow network according to the present embodiment.

The OpenFlow network includes multiple controllers 1 (1-1, 1-2), multiple switches 2 (2-1 to 2-4), and multiple terminals (3-1 to 3-8). The controller 1-1 controls the switches 2-1 and 2-2. Specifically, it controls the flow tables or the like of these switches. Similarly, the controller 1-2 controls the switches 2-3 and 2-4. Specifically, it controls the flow tables or the like of these switches. Of course, the controllers 1-1 and 1-2 can control any number of switches. Hereafter, the controllers 1-1 and 1-2 will be simply referred to as the "controllers 1" unless these controllers need to be distinguished from each other.

The switch 2-1 includes a flow table. The switch 2-1 is a device that receives packets from terminals 3-1 and 3-2 or another switch, 2-2, and forwards the received packets on the basis of the flow table. Of course, the switch 2-1 can receive packets from any number of terminals. The configurations of the switches 2-2 to 2-4 are similar to that of the switch 2-1. Hereafter, the switches 2-1 to 2-4 will be referred to as the "switches 2" unless these switches need to be distinguished from one another.

The terminal 3-1 transmits or receives packets. The terminal 3-1 is, for example, a general-purpose personal computer, a mobile phone, or the like. The same applies to the terminals 3-2 to 3-7. Hereafter, the terminals 3-1 to 3-8 will be referred to as the "terminals 3" unless these terminals need to be distinguished from one another.

Figure 2:
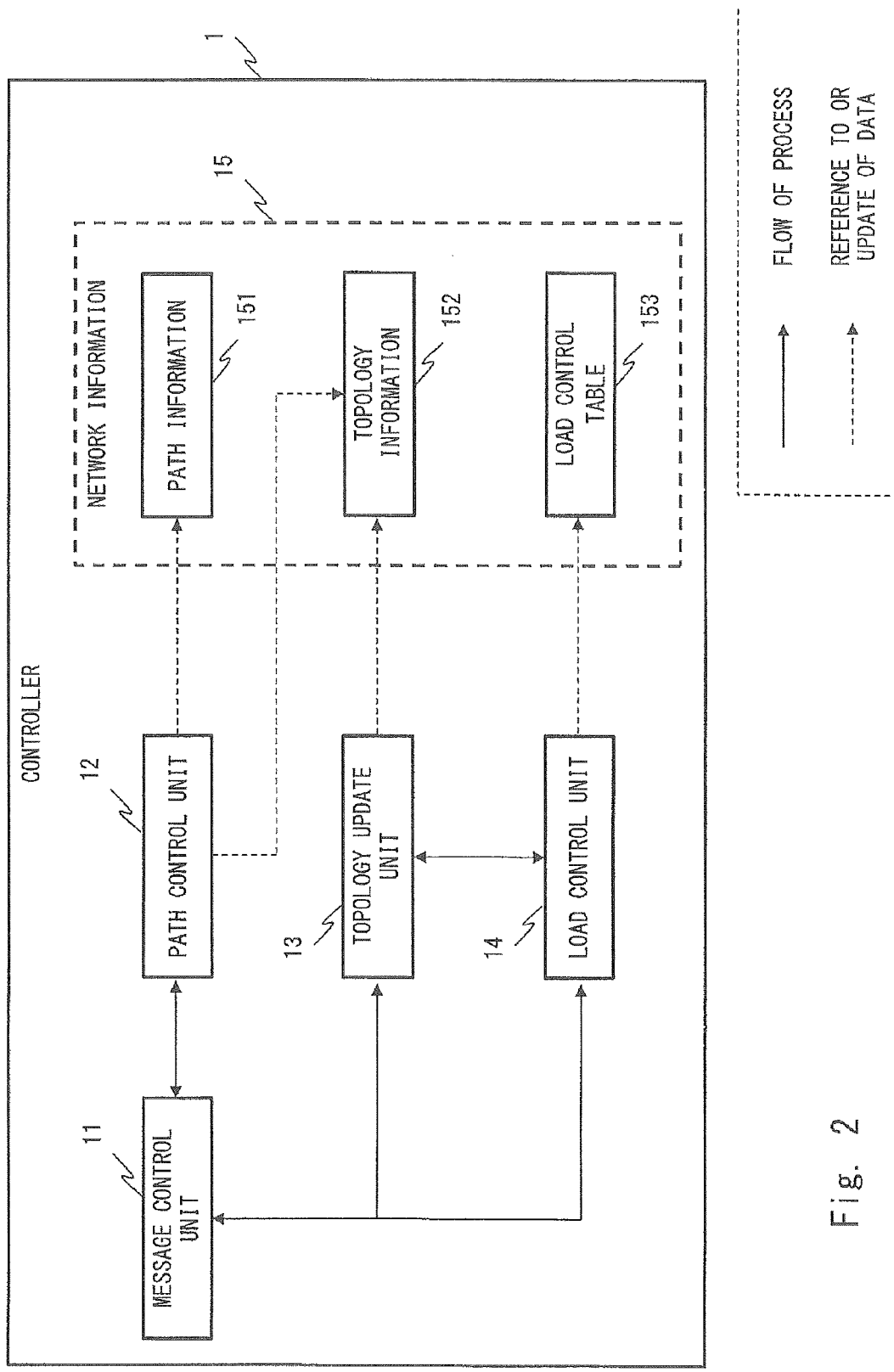
FIG. 2 is a block diagram showing the configuration of a controller according to the first embodiment.

Next, referring to FIG. 2, the internal configuration and operation of a controller 1 will be described. FIG. 2 is a block diagram showing the internal configuration of the controller 1. The controller 1 includes a message control unit 11, a path control unit 12, a topology update unit 13, a load control unit 14, and a network information storage unit 15. The controller 1 only has to be a computer including a central processing unit (CPU) and the like.

The network information storage unit 15 stores path information 151, topology information 152, and a load control table 153. The path info nation 151 includes so-called "flow information," which indicates how each switch 2 transmits packets. The topology information 152 indicates the configuration of the OpenFlow network. The load control table 153 is a table holding information for grasping the status of the load of each controller 1. The load control table 153 will be described later with reference to FIG. 3.

The sets of information in the network information storage unit 15 are synchronized among all the controllers 1 (the controllers 1 notify one another of any changes in the sets of information). That is, when any information in the network information storage unit 15 of one controller 1 is updated, corresponding information in the network information storage unit 15 of each of the other controllers 1 is updated as well.

The message control unit 11 is a processing unit that transmits or receives various types of messages defined by the OpenFlow network protocol to or from switches 2 controlled by the controller 1. Based on a received message, the message control unit 11 instructs the processing units (path control unit 12, topology update unit 13, load control unit 14) to perform processes.

The path control unit 12 receives a packet-in message from a switch 2 through the message control unit 11. The path control unit 12 then refers to the topology information 152 and computes a path according to the packet-in message. The path control unit 12 then updates the path information 151 on the basis of the computed path.

The topology update unit 13 acquires information on the connection of each of the switches 2 controlled by the controller 1 by transmitting query packets to the switches 2. The topology update unit 13 then updates the topology information 152 on the basis of the acquired connection information.

The load control unit 14 refers to and updates load information in the load control table 153. When a predetermined event (the lapse of a predetermined time, addition or deletion of a switch 2, or the like) occurs, the load control unit 14 computes the processing load of each controller 1 and detects a controller 1 having a high processing load. The load control unit 14 then determines whether the processing load of the detected controller 1 should be distributed. If it determines that the processing load should be distributed, the load control unit 14 places some of the switches 2 controlled by the detected controller 1 under the control of a controller 1 having a low processing load. Details of the processing load distribution process will be described later with reference to FIGS. 6 and 7.

FIG. 3 is a conceptual diagram showing the configuration of the load control table 153. The load control table 153 is a table having a switch ID, controller ID, hop count, received message count, and received packet count as attributes. The load control table 153 has entries corresponding to the switches in the OpenFlow network.

The switch ID is an attribute for uniquely identifying a switch 2 in the OpenFlow network and is information serving as a primary key of the load control table 153. The switch ID is, for example, a data path ID consisting of 48 bits of the MAC address of a switch 2 and 12 bits thereof depending on the implementation. The controller 1 can acquire the data path ID of a switch 2 by exchanging OpenFlow protocol Features/Reply messages with the switch 2 after establishing a secure channel therewith.

The controller ID is an attribute for uniquely identifying a controller 1 in the OpenFlow network. The controller ID may be, for example, the Internet Protocol (IP) address of a controller 1.

The hop count is an attribute indicating the number of hops between a controller 1 and a switch 2 (the number of communication devices through which packets pass.

The received message count is an attribute indicating the number of messages which a controller 1 has received from a switch 2 over a predetermined time. Each time the controller 1 receives a message from the switch 2, the received message count is incremented (by one).

The received packet count is an attribute indicating the number of packets which a switch 2 controlled by a controller 1 has received from terminals 3 or adjacent switches 2. The controller 1 can grasp the number of packets which each port of the switch 2 has received over a predetermined time by transmitting or receiving OpenFlow protocol Statistics Request/Reply messages to the switch 2.

Figure 4:
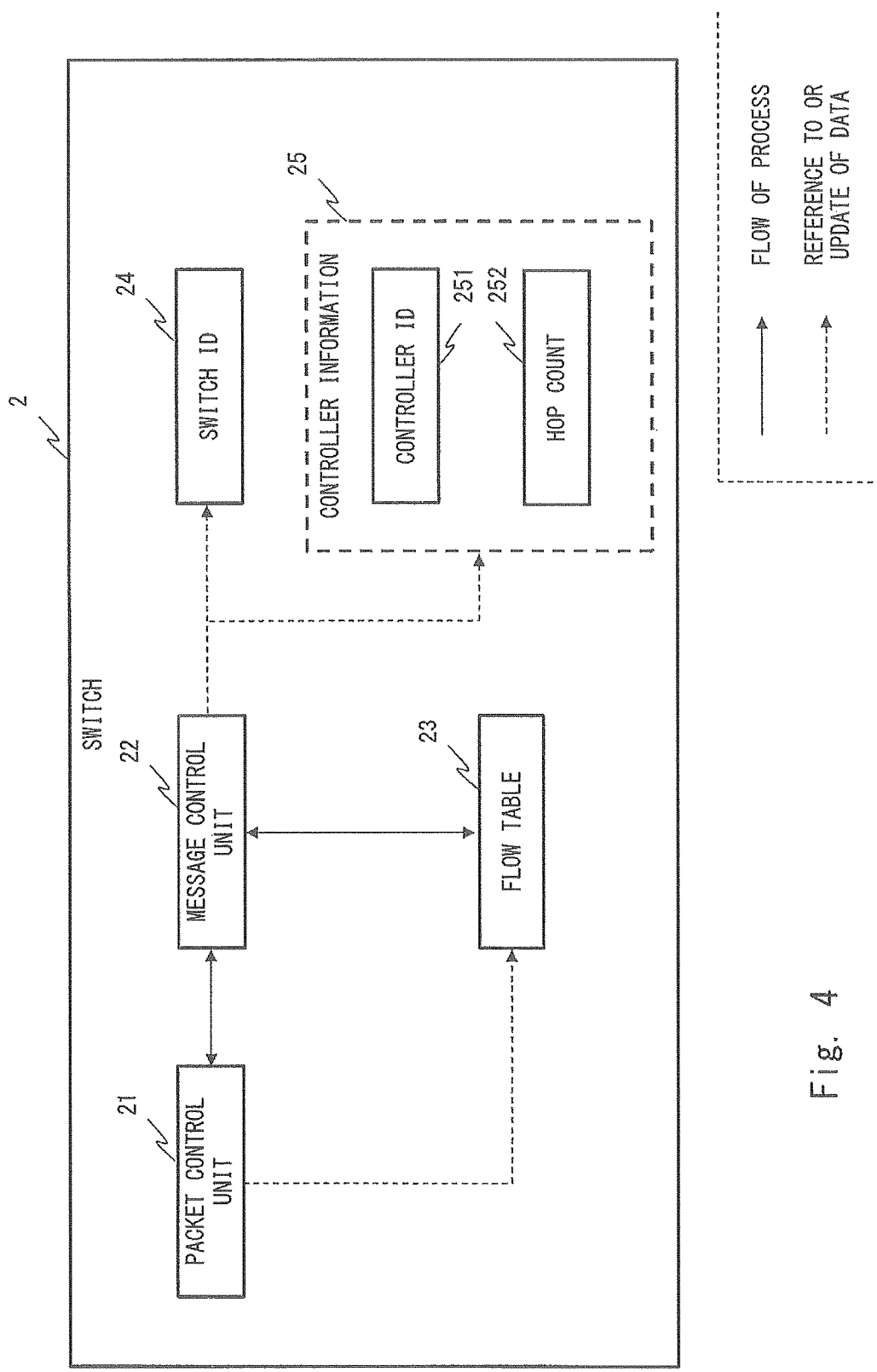
FIG. 4 is a block diagram showing the configuration of a switch according to the first embodiment.

Next, referring to FIG. 4, the internal configuration and operation of a switch 2 according to the present embodiment will be described. FIG. 4 is a block diagram showing the internal configuration of a switch 2 according to the present embodiment.

The switch 2 includes a packet control unit 21 and a message control unit 22. The switch 2 stores a flow table 23, a switch ID 24, and controller information 25. The controller information 25 includes a controller ID 251 and a hop count 252.

When the packet control unit 21 receives a packet from a terminal 3 or adjacent switch 2, it determines the destination of the received packet with reference to the flow table 23 and then forwards the packet to the destination. When a new switch 2 is added to the OpenFlow network, the packet control unit 21 acquires controller information 25 in adjacent switches 2 by transmitting query packets to the switches 2.

The message control unit 22 transmits or receives messages defined by the OpenFlow protocol to or from the message control unit 11 of the controller 1. When the message control unit 22 receives a flow-mod message from the controller 1, it updates the flow table 23 on the basis of the received message. Further, when the switch 2 establishes a secure channel with the controller 1, the message control unit 22 transmits the switch ID 24 to the controller 1.

The flow table 23 is information set by the controller 1. A packet forwarding path, a packet forwarding method, and the like are described for each communication flow in the flow table 23. For details, see, e.g., Non-Patent Literature 1.

The switch ID 24 is information uniquely identifying the switch 2. The controller ID 251 is information indicating the ID of the controller 1 which controls the flow table 23. The hop count 252 is the number of hops between the switch 2 and the controller 1.

Next, referring to FIGS. 5 to 7, the operation of a controller 1 will be described. As described above, when a predetermined event (the lapse of a predetermined time, or the like) occurs, the load control unit 14 of the controller 1 performs a process of distributing the load of each controller 1 (load distribution process). Hereafter, the load distribution process and associated operations of the controller 1 will be described in detail.

Figure 5:
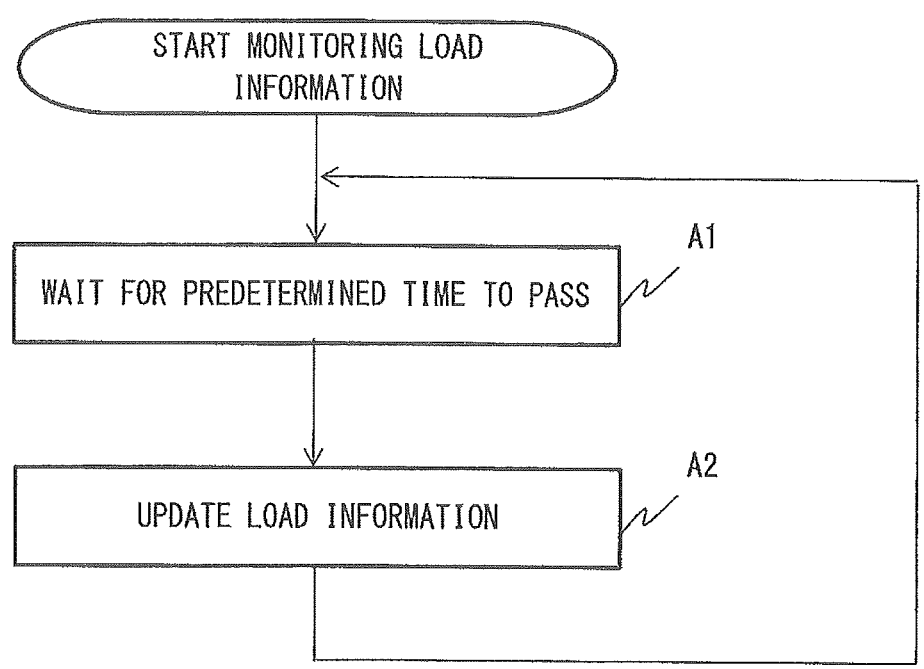
FIG. 5 is a flowchart showing the control operation of the controller according to the first embodiment.

FIG. 5 is a flowchart showing the control operation of the controller 1. The controller 1 waits for a predetermined time to pass (step A1). After the predetermined time passes, the controller 1 performs a load information update process (FIG. 6) (step A2).

Figure 6:
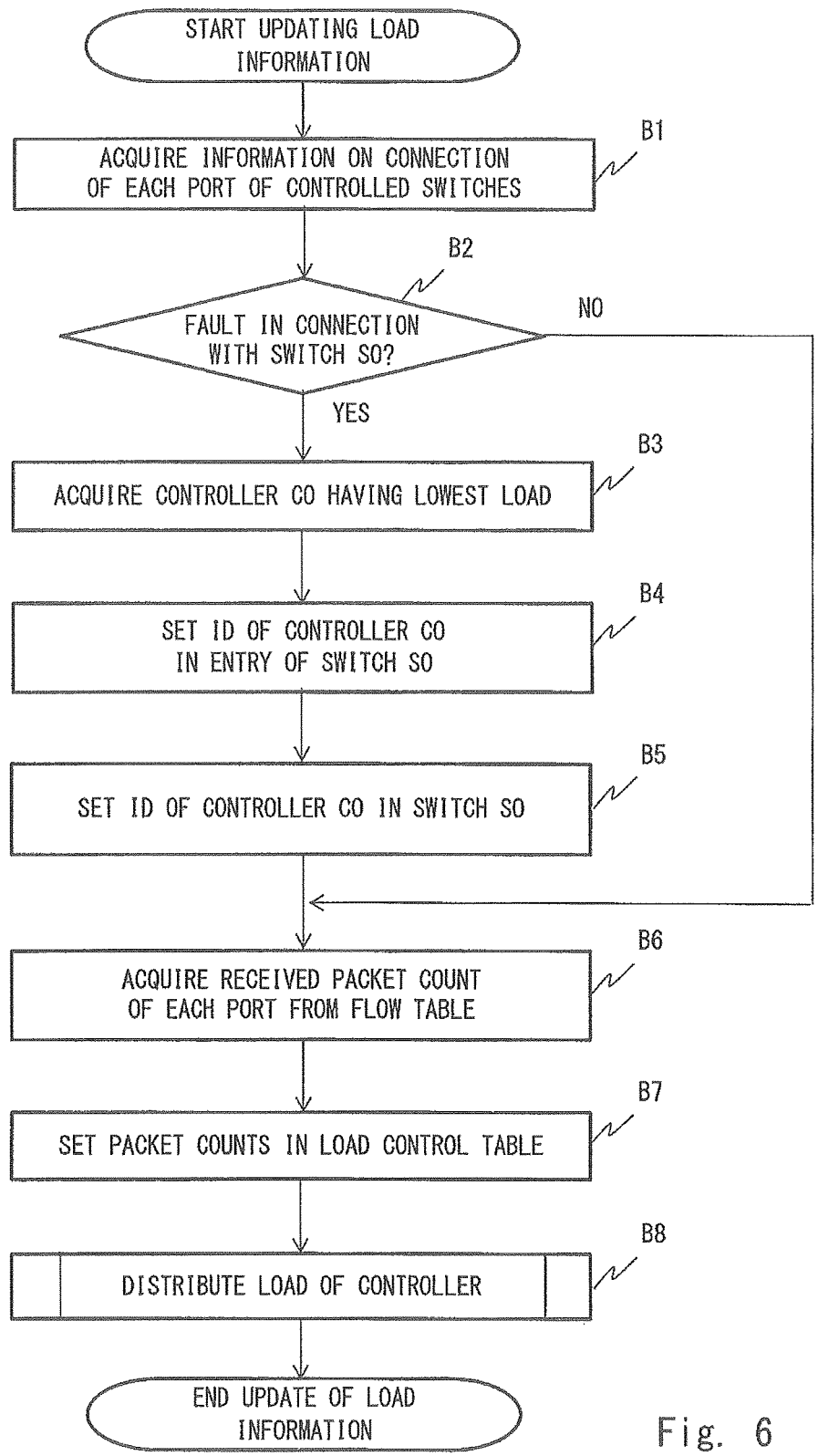
FIG. 6 is a flowchart showing a load information update process performed by the controller according to the first embodiment.

FIG. 6 is a flowchart showing details of the load information update process performed by the controller 1. First, the topology update unit 13 of the controller 1 acquires information on the connection of each port of each switch 2 controlled by the controller 1 by transmitting query packets to the switches 2 (step B1). If the controller 1 detects a switch 2 having a connection failure (hereafter referred to as the switch S0) (step B2: Yes), the topology update unit 13 notifies the load control unit 14 of the switch S0. The load control unit 14 then computes the processing load of each controller 1 in the OpenFlow network to acquire the ID of a controller 1 having a lowest processing load (hereafter referred to as the controller C0) (step B3): Note that a method for computing the processing load will be described later with reference to FIG. 7.

Further, the load control unit 14 sets the ID of the controller C0 in the "controller ID" attribute of the entry of the switch S0 in the load control table 153 (step B4). The load control unit 14 of the controller C0 also sets the ID of the controller C0 in the controller ID 251 of the switch S0 through a secure channel (step B5).

The load control unit 14 of the controller 1 also acquires a received packet count from each of the switches 2 controlled by the controller 1 and sets them in the load control table 153 (steps B6, B7). At this time, the load control unit 14 excludes the received packet count of a port which has been unused due to a change in topology. Due to the above steps B1 to B7, the connection failure has been eliminated, and the received packet counts have been acquired. In this state, a controller load distribution process (step B8) is performed. FIG. 7 shows details of the load distribution process (step B8).

The load control unit 14 refers to the load control table 153 and computes the processing load of each controller 1. For example, the load control unit 14 computes the processing load in the form of numerical information by multiplying the received message count and the received packet count. The load control unit 14 then acquires the ID of a controller 1 having a highest processing load (hereafter referred to as the controller C1) (step C1).

Note that the processing load need not necessarily be numerical information and may be information such as "high," "middle," or "low" based on a predetermined threshold.

The load control unit 14 then determines whether the processing load of the controller C1 is lower than or equal to a predetermined threshold (first threshold) (step C2). If the processing load is lower than or equal to the predetermined threshold (step C2: Yes), the load control unit 14 ends the process.

In contrast, if the processing load of the controller C1 is not lower than or equal to the predetermined threshold (step C2: No), the load control unit 14 selects a controller 1 having a lowest processing load (hereafter referred to as the controller C2) and acquires the ID thereof (step C3).

The load control unit 14 then selects a switch 2 having a relatively small influence on the processing load (hereafter referred to as the switch S1) from among switches 2 controlled by the controller C1 and acquires the ID thereof (step C4). In other words, the load control unit 14 selects a switch 2 in accordance with the ascending order of the magnitude of the influence on the processing load. For example, when the load control unit 14 performs step C4 for the first time, it selects, as the switch S1, a switch 2 having the smallest influence on the processing load.

The load control unit 14 then acquires the hop count of the switch S1 from the load control table 153 and determines whether the acquired hop count is greater than or equal to a threshold (second threshold) (step C5). If the hop count is not greater than or equal to the threshold (step C5: No), the load control unit 14 returns to step C4. At this time, the load control unit 14 selects a switch 2 having the lowest processing load next to the switch S1 selected in the last step C4.

If the hop count is greater than or equal to the threshold (step C5: Yes), the load control unit 14 sets the ID of the controller C2 in the "controller ID" attribute of the entry of the switch S1 of the load control table 153 (step C6). The load control unit 14 also sets the ID of the controller C2 in the controller ID 251 of the switch S1 through a secure channel (step C7).

After step C7, the load control unit 14 returns to step C1.

While the load control unit 14 selects the controller C1 through the comparison with the predetermined threshold (first threshold) in the above process, it may select the controller C1 in other ways. That is, the load control unit 14 may select a controller 1 whose processing load should be distributed in accordance with any criterion. For example, the load control unit 14 may unconditionally select, as the controller C1, a controller 1 having the highest processing load.

While the determination on the hop count is made in the above process, a switch 2 having the lowest processing load may be determined as the switch S1 without making a determination on the hop count. However, determination of the hop count has an effect of simply distributing the processing load, as well as an effect of preventing complication of the network configuration.

While the controller 1 having the lowest processing load is selected as the controller 1 (C2) to alternatively control the switch 2 in the above description, any controller 1 having a processing load lower than or equal to the predetermined value may be selected. However, by selecting a controller 1 in accordance with the ascending order of the magnitude of the processing load, the processing load can be optimally balanced.

Figure 8:
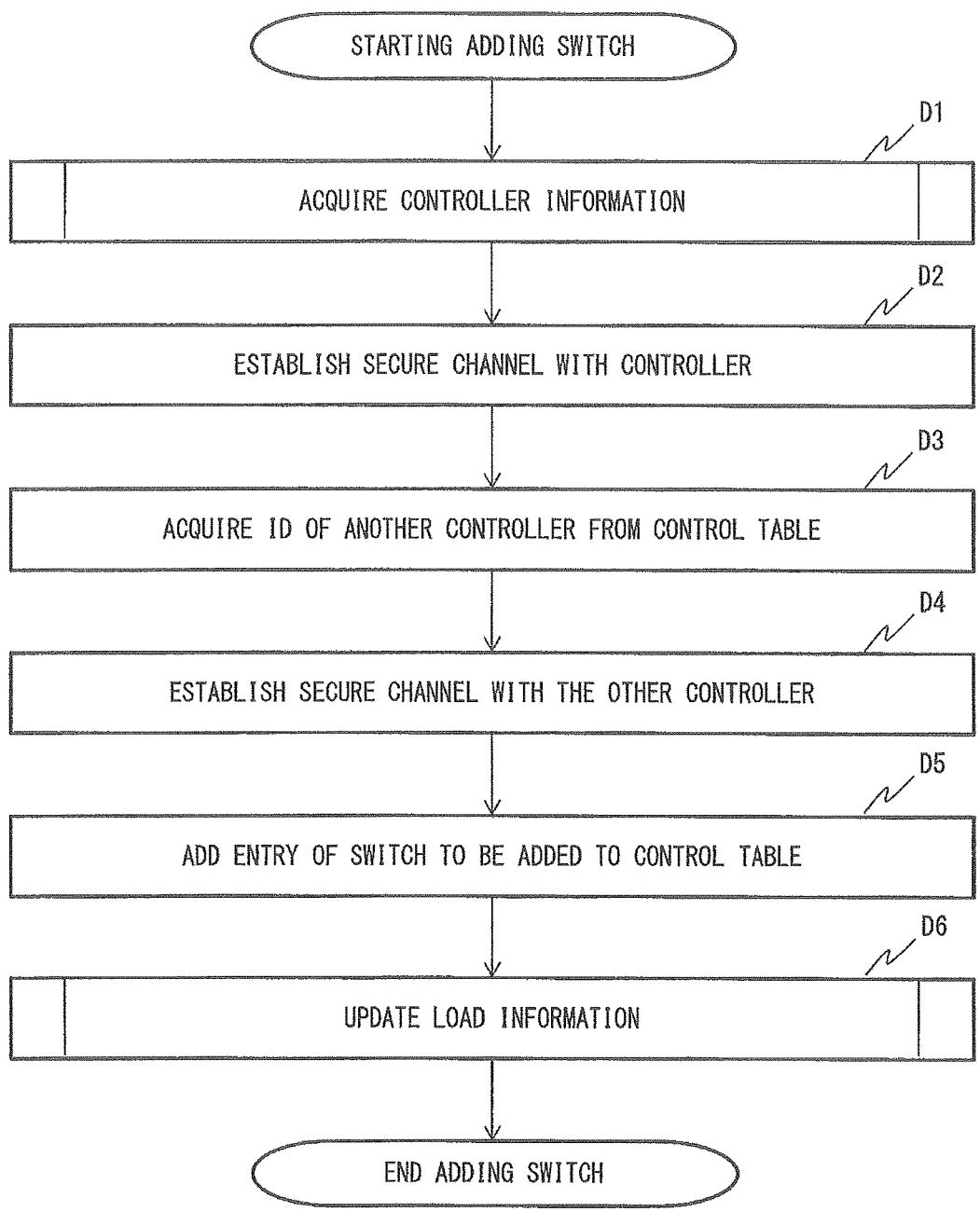
FIG. 8 is a flowchart showing a process of adding a switch to the OpenFlow network according to the first embodiment.
Figure 9:
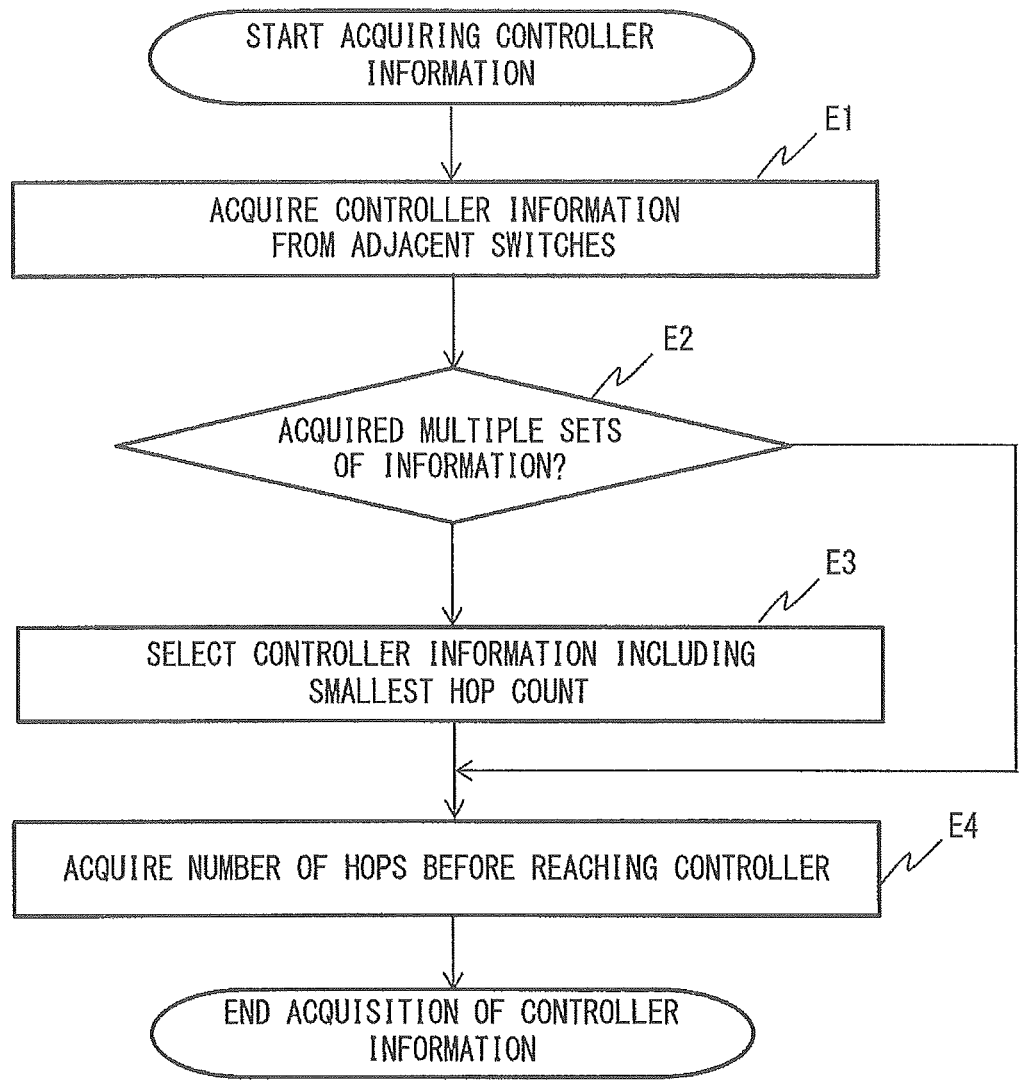
FIG. 9 is a flowchart showing a controller information acquisition process performed by the switch according to the first embodiment.

Next, referring to FIGS. 8 and 9, processes performed by the devices (controllers 1, switches 2) when a new switch 2 is added to the OpenFlow network will be described. FIG. 8 is a flowchart showing a process of adding a switch 2.

First, the packet control unit 21 of a switch 2 to be added (hereafter referred to as the "target switch 2") acquires controller information 25 from adjacent switches 2 (step D1). This controller information acquisition process will be described with reference to FIG. 9.

The packet control unit 21 of the target switch 2 broadcasts query packets to the adjacent switches and receives controller information 25 (step E1). If the packet control unit 21 receives sets of controller information 25 from multiple switches 2 (step E2: Yes), it selects a set of controller information 25 including the smallest hop count 252 (step E3). The packet control unit 21 then communicates with the controller 1 through the message control unit 22 and acquires the number of hops 252 before reaching the controller 1 (step E4).

Referring back to FIG. 8, the message control unit 22 of the switch 2, which has acquired the controller information 25 (step D1), refers to the controller ID 251 in the controller information 25 and establishes a secure channel with a controller 1 identified by the controller ID 251 (step D2).

The message control unit 22 then acquires the IDs of the other controllers 1 from the load control table 153 of the controller 1 and establishes secure channels with those controllers 1 (steps D3, D4).

The load control unit 14 of each controller 1 in the OpenFlow network adds, to the load control table 153, the entry of the target switch 2 (step D5). At this time, the load control unit 14 sets the value of the switch ID 24 of the target switch 2 in the "switch ID" attribute of the load control table 153. The load control unit 14 also sets the value of the hop count 252 of the target switch 2 in the "hop count" attribute of the load control table 153. The load control unit 14 also sets 0 in each of the "received message count" and "received packet count" attributes of the load control table 153. The load control unit 14 then performs a load information update process (the process of FIG. 6) (step D6).

Figure 10:
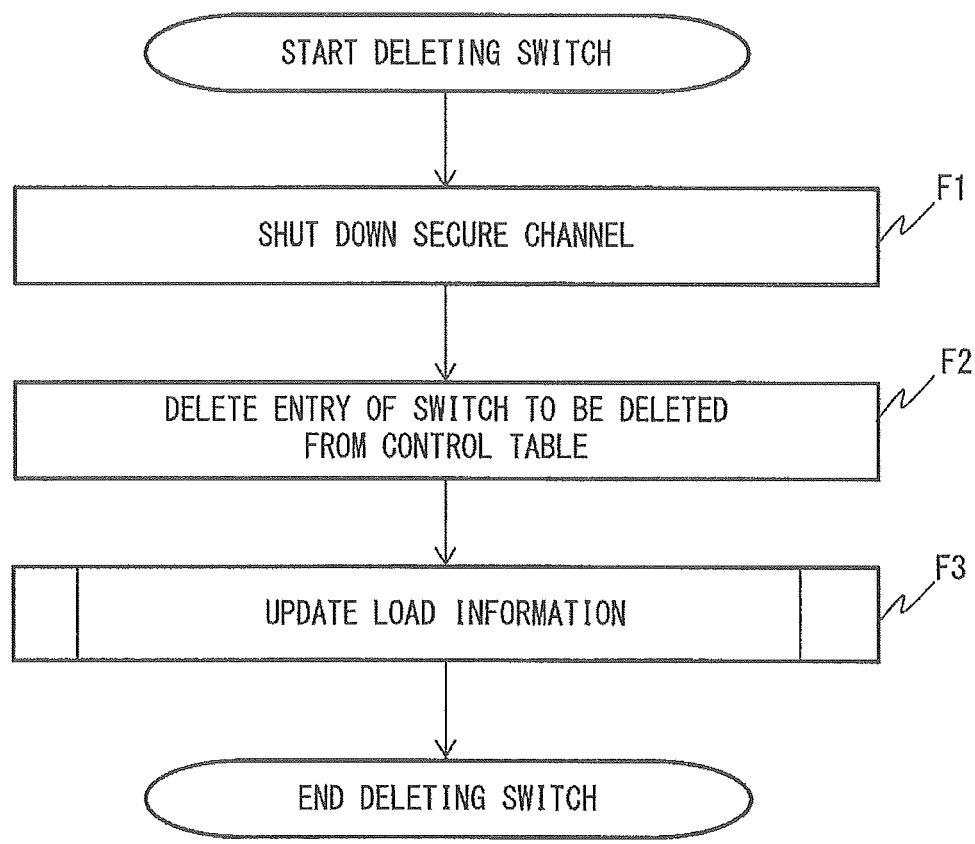
FIG. 10 is a flowchart showing a process of deleting a switch from the OpenFlow network according to the first embodiment.

Next, referring to FIG. 10, processes performed by the devices (controllers 1, switches 2) when a switch 2 is deleted from the OpenFlow network will be described. FIG. 10 is a flowchart showing a process of deleting a switch 2.

The message control unit 22 of a switch 2 to be deleted (hereafter referred to as the "target switch 2") shuts down secure channels with all the controllers 1 in the OpenFlow network (step F1). In response, the load control unit 14 of each controller 1 deletes the entry of the target switch 2 from the load control table 153 (step F2). The load control unit 14 then performs the load information update process (the process of FIG. 6) (step F3).

Figure 11:
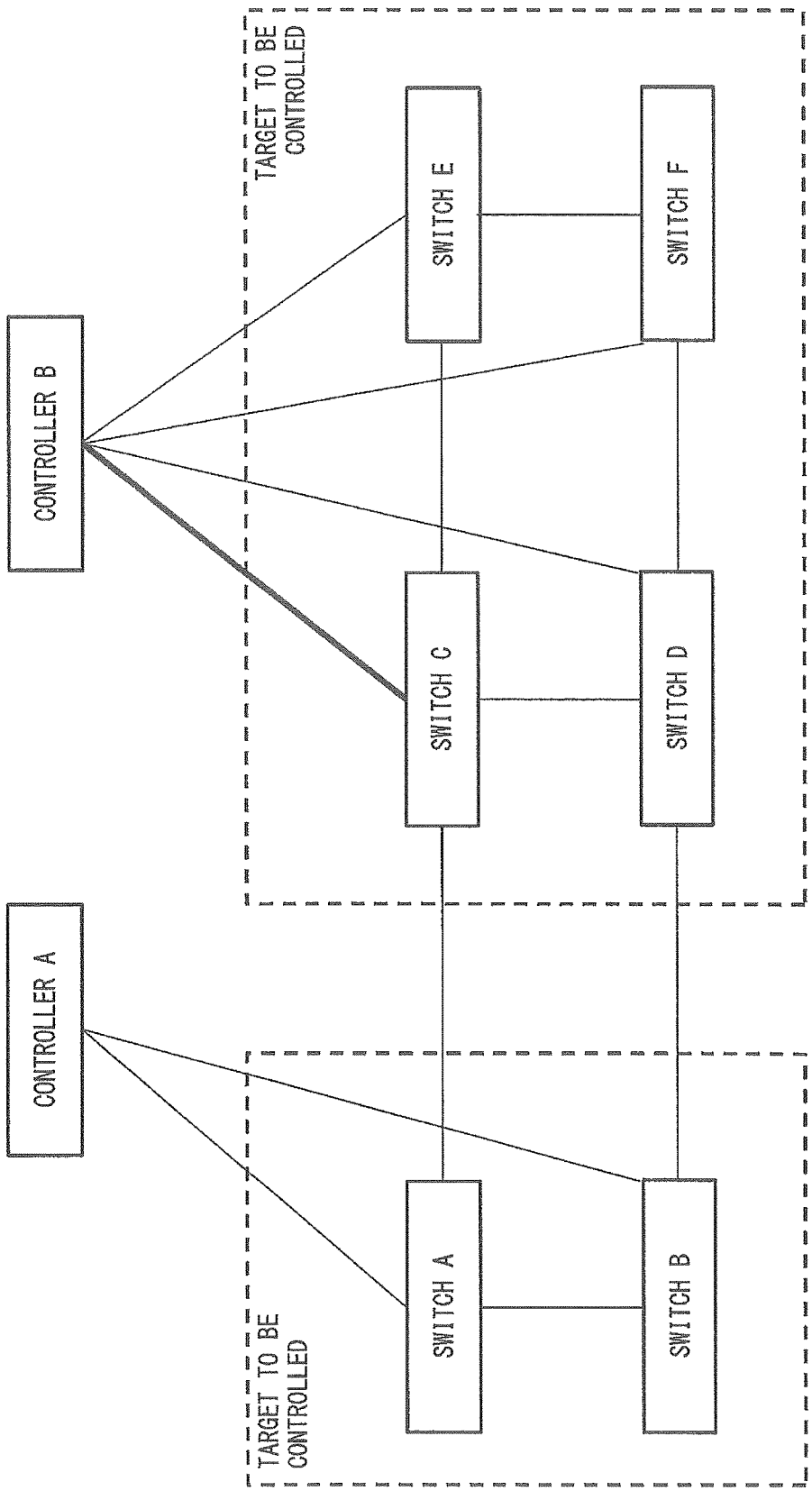
FIG. 11 is a block diagram showing the configuration of the OpenFlow network according to the first embodiment.

Next, referring to FIGS. 11 to 14, a specific example of the process of distributing the processing load of the controller 1 shown in FIG. 7 will be described. FIG. 11 is a block diagram showing the configuration of an OpenFlow network before a load distribution process is performed. FIG. 12 is a conceptual diagram showing the configuration of the load control table 153 before the load distribution process is performed.

The load control unit 14 computes the processing loads of controllers (controllers A and B) in the OpenFlow network (step C1). In this embodiment, the load control unit 14 computes the processing load of each controller using the following formula.

The processing load of the controller C to be computed= (the received message count of a controller C/the total received message count of all controllers)*(the received packet count of switches controlled by the controller C/the total received packet count of all switches)

Referring to FIG. 12, the total received message count is 120 and the total received packet count is 800. Therefore, the processing load of the controller A is (50/120)*(300/800) ≈0.16. Similarly, the processing load of the controller B is (70/120)*(500/800)≈0.36. Accordingly, the load control unit 14 selects the controller B as a controller having the highest processing load (step C1).

The above computation method is illustrative only, and other methods may be employed. For example, the left side or right side (or both sides) of the multiplication formula may be multiplied by a weighting factor. The processing load may also be computed by addition rather than by multiplication. That is, the load control unit 14 only has to compute the processing load of each controller 1 on the basis of the information in the load control table 153. Note that the load control unit 14 can grasp the tendency of the processing load of each controller 1 by using at least one of the received message count and the received packet count in the load control table 153, although the accuracy of computation is reduced.

The load control unit 14 then determines whether the processing load of the selected controller B is lower than or equal to the predetermined threshold (step C2). Assuming that the threshold is 0.3, the load control unit 14 determines that the processing load of the controller B is not lower than or equal to the threshold (step C2: No). The load control unit 14 then selects the controller A as a controller having the lowest processing load (step C3).

The load control unit 14 then acquires the ID of a switch having the smallest influence on the processing load of switches controlled by the controller B. Referring to FIG. 12, the influence of the switch C on the processing load is (5/120)*(100/800)≈0.01. The influence of the switch D on the processing load is (30/120)*(200/800)≈0.06. The influence of the switch E on the processing load is (15/120)* (100/800)≈0.02. The influence of the switch F on the processing load is (20/120)*(100/800)≈0.02. Accordingly, the load control unit 14 selects the switch C as the switch having the smallest influence on the processing load (step C4).

The load control unit 14 then refers to the load control table 153 and determines whether the hop count of the switch C is a threshold (step C5). Assuming that the threshold is 2, the load control unit 14 determines that the hop count of the switch C is greater than or equal to the threshold (step C5: Yes).

The load control unit 14 then sets the ID of the controller A in the "controller ID" attribute of the entry of the switch C of the load control table 153 (step C6). The load control unit 14 also sets the ID of the controller A in the controller ID 251 of the switch C through the secure channel (switch C7). FIG. 13 shows the load control table 153 at the point in time when this process is complete. An underlined portion represents the change of the controller. While the value of the hop count may vary with the change of the controller, it is assumed in the present embodiment that the hop count does not vary.

Then the load control unit 14 again computes the processing loads of the controllers (controllers A and B) in the OpenFlow network (step C1).

Referring to FIG. 13, the total received message count is 120, and the total received packet count is 800. Therefore, the processing load of the controller A is (55/120)*(400/800)≈0.23. Similarly, the processing load of the controller B is (65/120)*(400/800) 0.27. Accordingly, the load control unit 14 selects the controller B as a controller having the highest processing load (step C1).

Figure 14:
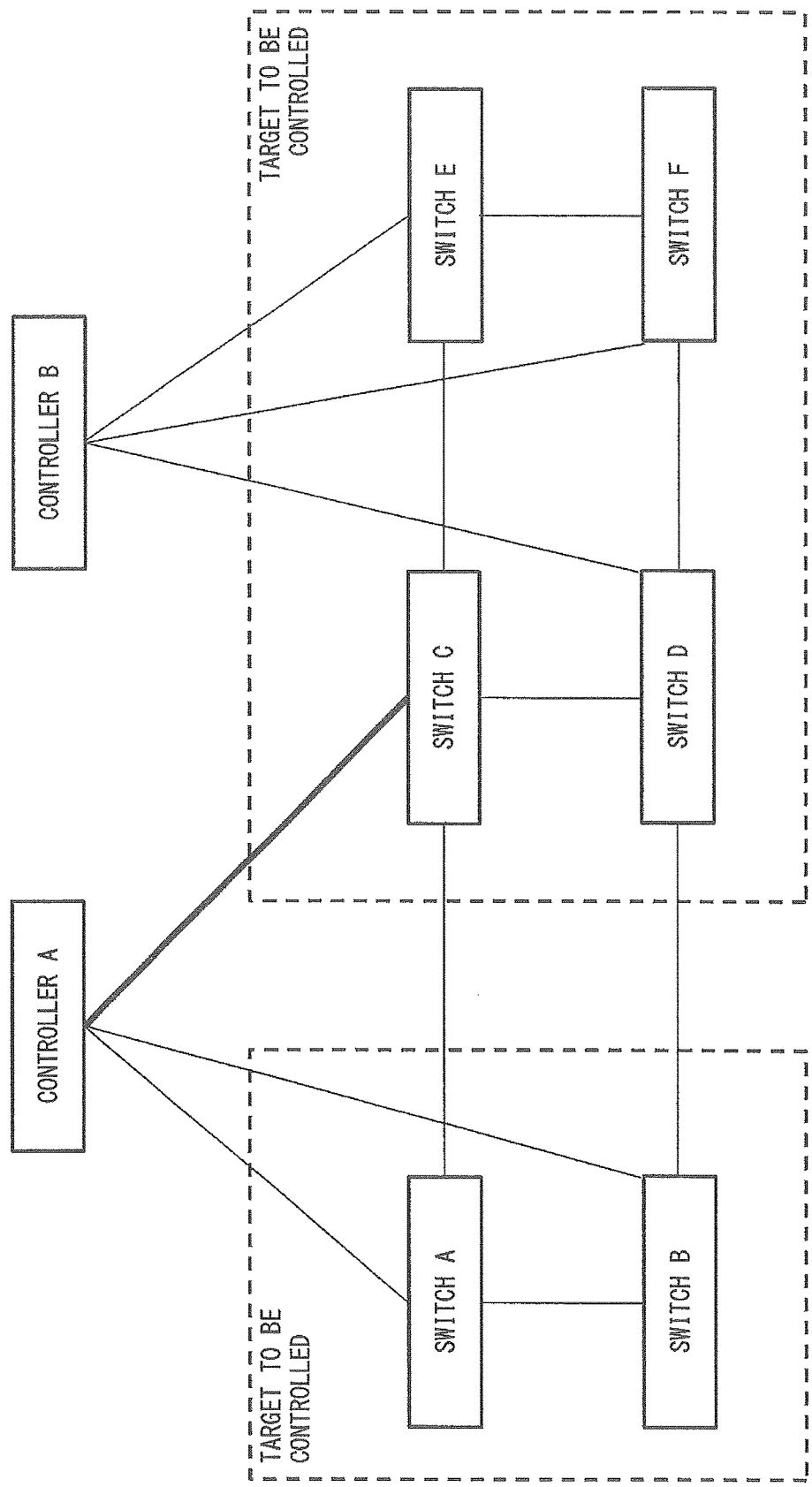
FIG. 14 is a block diagram showing the configuration of the OpenFlow network according to the first embodiment.

The load control unit 14 then determines whether the processing load of the selected controller B is lower than or equal to the predetermined threshold (step C2). Since the threshold is 0.3, the load control unit 14 determines that the processing load of the controller B is lower than or equal to the threshold (step C2: Yes), ending the process. FIG. 14 is a block diagram showing the configuration of the OpenFlow network after the load distribution process is performed.

Next, effects of the OpenFlow network according to the present embodiment will be described. The load control unit 14 distributes the processing load of a controller 1 on the basis of the use state of the switches 2 or the topology of the OpenFlow network. Thus, it is possible to avoid a processing load from being unevenly imposed on a particular controller 1 and to distribute the load accurately.

Further, when a switch 2 is added to or deleted from the OpenFlow network, the controller 1 updates the topology information (performs the above steps B1 to B7) prior to distributing the load. Thus, the load can be distributed after the connection state of each device in the OpenFlow network is updated.

Second Embodiment

Figure 7:
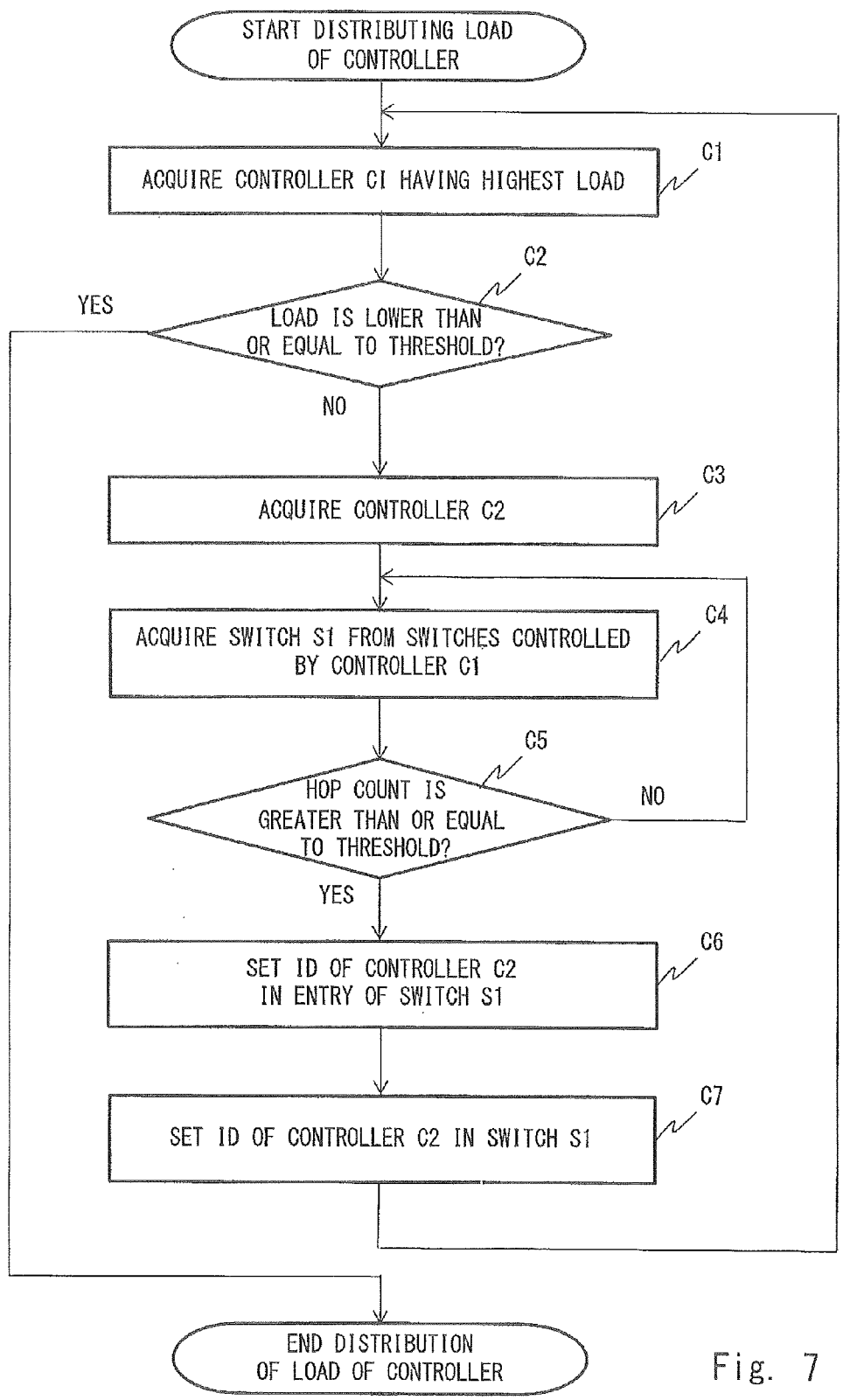
FIG. 7 is a flowchart showing a load distribution process performed by the controller according to the first embodiment.

Controllers 1 according to a second embodiment of the present invention are characterized in that the controllers 1 consider the number of switches controlled by each controller in the load distribution process of FIG. 7. The difference between the second embodiment and the first embodiment will be described below.

In the above FIG. 7, the load control unit 14 computes the processing load of each controller 1 using the following formula.

The processing load of the controller C to be computed= (the number of switches controlled by the controller C/the number of all switches in the OpenFlow network)*(the received message count of the controller C/the total received message count of all controllers)*(the received packet count of switches controlled by the controller C/the total received packet count of all switches)

Next, referring again to FIGS. 11 to 14, a specific example of the process of distributing the load of the controller 1 (FIG. 7) according to the present embodiment will be described. As described above, FIG. 11 is a block diagram showing the configuration of the OpenFlow network before a load distribution process is performed. FIG. 12 is a conceptual diagram showing the configuration of the load control table 153 before the load distribution process is performed.

Referring to FIG. 12, the total switch count is 6 and the total received message count is 120. Therefore, the processing load of the controller A is (2/6)*(50/120)*(300/800) ≈0.05. Similarly, the processing load of the controller B is (4/6)*(70/120)*(500/800)≈0.24. Accordingly, the load control unit 14 selects the controller B as a controller having the highest processing load (step C1).

The load control unit 14 then determines whether the processing load of the selected controller B is lower than or equal to a predetermined threshold (step C2). Assuming that the threshold is 0.2, the load control unit 14 determines that the processing load of the controller B is not lower than or equal to the threshold (step C2: No). The load control unit 14 then selects the controller A as a controller having the lowest processing load (step C3).

The load control unit 14 then acquires the ID of a switch having the smallest influence on the processing load of switches controlled by the controller B. The load control unit 14 computes the influence on the processing load on the basis of the FIG. 12 as follows.

Switch C: (5/120)*(100/800)
Switch D: (30/120)*(200/800)
Switch E: (15/120)*(100/800)
Switch F: (20/120)*(100/800)

Accordingly, the load control unit 14 selects the switch C as a switch having the smallest influence on the processing load (step C4). The load control unit 14 then refers to the load control table 153 and determines whether the hop count of the switch C is greater than or equal to a threshold (step C5). Assuming that the threshold is 2, the load control unit 14 determines that the hop count of the switch C is greater than or equal to the threshold (step C5: Yes).

The load control unit 14 then sets the ID of the controller B in the "controller ID" attribute of the entry of the switch C of the load control table 153 (step C6). The load control unit 14 also sets the ID of the controller B in the controller ID 251 of the switch C through a secure channel (switch C7). FIG. 13 shows the load control table 153 at the point in time when this process is complete. An underlined portion represents the change of the controller.

The load control unit 14 again computes the processing loads of the controllers (controllers A and B) in the OpenFlow network (step C1).

Referring to FIG. 13, it is seen that the total switch count is 6, the total received message count is 120, and the total received packet count is 800. Therefore, the processing load of the controller A is (3/6)*(55/120)*(400/800)≈0.11. Similarly, the processing load of the controller B is (3/6)*(65/120)*(400/800)≈0.13. Accordingly, the load control unit 14 selects the controller B as a controller having the highest processing load (step C1).

The load control unit 14 then determines whether the processing load of the selected controller B is lower than or equal to the predetermined threshold (step C2). Since the threshold is 0.2, the load control unit 14 determines that the processing load of the controller B is lower than or equal to the threshold (step C2: Yes), ending the process. FIG. 14 is a block diagram showing the configuration of the OpenFlow network after the load distribution process is performed.

In the present embodiment also, it is possible to avoid a load from being unevenly imposed on a particular controller 1 and to distribute the load accurately. As seen above, the load control unit 14 also considers the relationship between the total switch count and the number of switches controlled by each controller 1 and then distributes the load. Thus, it is possible to perforin load distribution where the connection state of the network is also considered (that is, load distribution where the number of switches controlled by each controller is avoided from being uneven in the network).

While the present invention has been described with regard to its embodiments, the invention is not limited to the configurations thereof. Of course, the present invention includes changes, modifications, or combinations which can be made to the embodiments by those skilled in the art, without departing from the scope of the claims of the present application.

The processes performed by the processing units (message control unit 11, path control unit 12, topology update unit 13, and load control unit 14) of the controller 1 can be embodied as a program which runs on any computer. This program can be stored in various types of non-transitory computer-readable media and provided to a computer. Examples of the non-transitory computer-readable media include various types of tangible storage media. Examples of the non-transitory computer-readable media include magnetic storage media (e.g., flexible disks, magnetic tapes, hard disk drives), magneto-optical storage media (e.g., magneto-optical disks), compact disc read-only memories (CD-ROMs), CD-Rs, CD-R/Ws, semiconductor memories (e.g., mask ROMs, programmable ROMs (PROMs), erasable PROMs (EPROMs), flash ROMs, and random access memories (RAMs). The program may be provided to a computer by various types of transitory computer-readable media. Examples of the transitory computer-readable media include electric signals, optical signals, and electromagnetic waves. The transitory computer-readable media can provide the program to the computer via a wired communication path such as an electric line or an optical fiber, or a wireless communication path.

Figure 15:
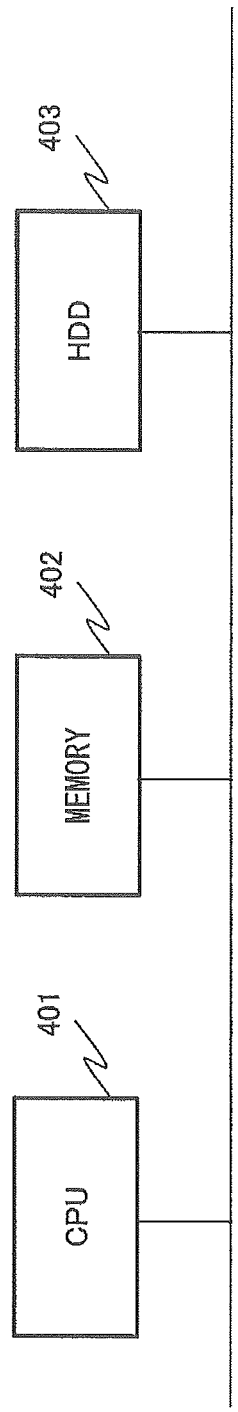
FIG. 15 is a block diagram showing the hardware configuration of the controller according to the first embodiment.

FIG. 15 is a diagram showing an example hardware configuration of a controller 1. The controller 1 includes a central processing unit (CPU) 401 and a memory 402. The CPU 401 and the memory 402 are connected to a hard disk drive (HDD) 403 serving as an auxiliary storage device through a bus. A storage medium such as the HDD 403 can store a computer program for giving an instruction to the CPU 401 or the like in cooperation with the operating system and performing the functions of the units of the CPU 401 or the like. That is, the blocks of the controller 1 are formed when this program is loaded into the memory 402 and then the CPU 401 performs processes on the basis of the program and collaborates with other hardware components. When the CPU 401 then executes a predetermined program, the controller 1 performs processes.

Figure 16:
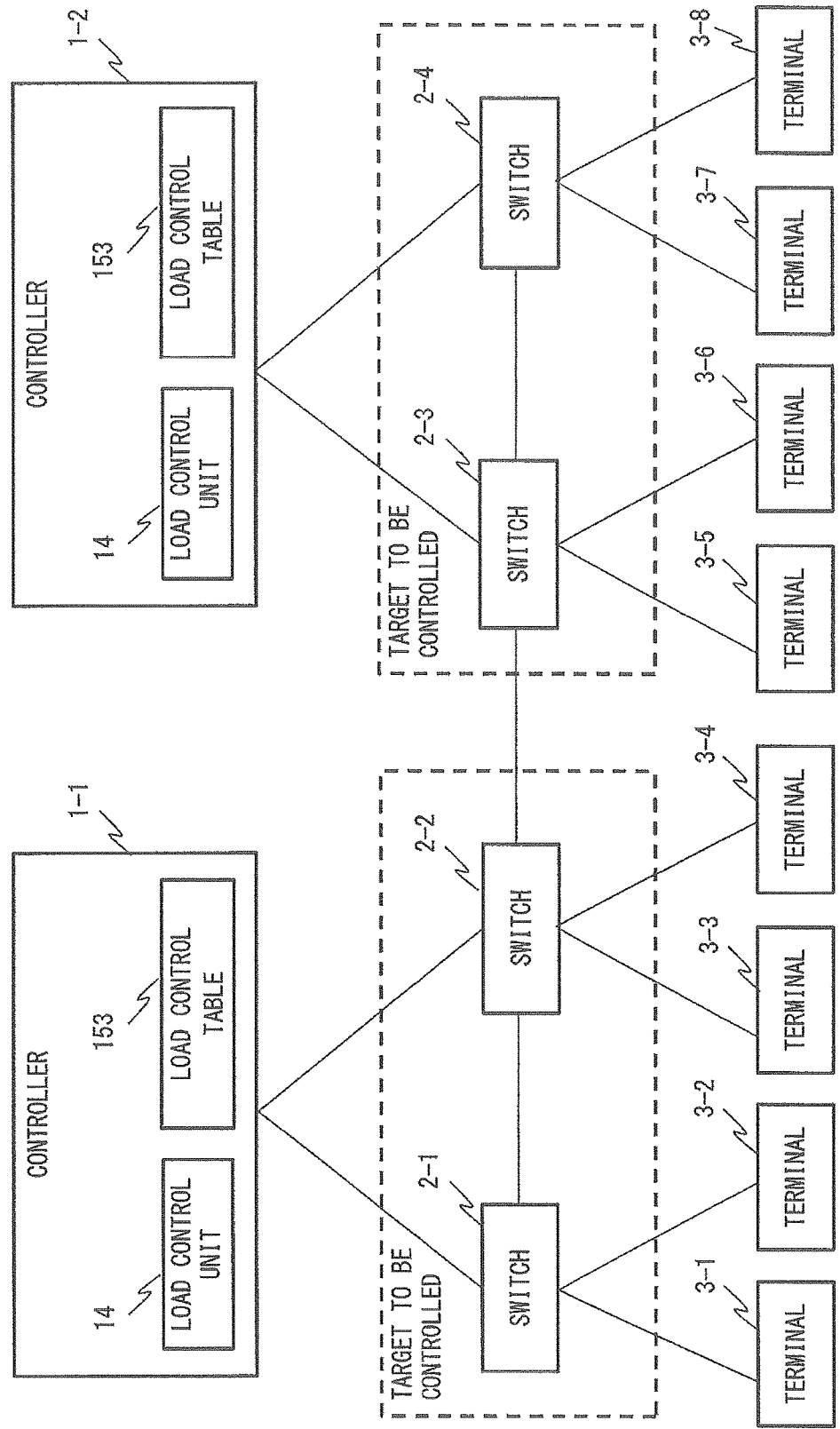
FIG. 16 is a block diagram showing the configuration of an OpenFlow network according to the present invention.

FIG. 16 is a block diagram schematically showing the present invention. The OpenFlow network includes the multiple controllers 1 and multiple switches 2. Each controller 1 includes the load control table 153 and the load control unit 14.

The load control table 153 controls at least one of the number of messages which each switch 2 in the OpenFlow network has transmitted to a controller controlling the switch 2 over a predetermined time and the number of packets that each switch 2 has received over a predetermined time. That is, the load control table 153 holds load information specific to the OpenFlow network. When a predetermined event occurs, the load control unit 14 refers to the load control table 153 and detects a controller 1 having a processing load higher than or equal to the first threshold. For example, the load control unit 14 computes the processing load by multiplying the received packet count and the received message count. The load control unit 14 then places at least one of switches 2 controlled by the detected controller 1 under the control of another controller 1.

According to the above configuration, the load control unit 14 can distribute the load of the controller 1 on the basis of the use state of the switches 2 or the topology of the OpenFlow network. That is, it is possible to avoid a load from being unevenly imposed on a particular controller 1.

While each controller 1 includes the load control table 153 and the load control unit 14 in the above description, other configurations are possible. For example, a control device for instructing each controller 1 to control switches 2 may be provided in the OpenFlow network. Such a control device includes the load control table 153 and the load control unit 14. The control device computes the processing load of each controller 1 and places a switch 2 controlled by a controller 1 having a high processing load under the control of another controller 1. This configuration can also produce the above effects.

The present application claims priority based on Japanese Patent Application No. 2012-020695, filed on Feb. 2, 2012, the disclosure of which is incorporated herein in its entirety.

REFERENCE SIGNS LIST 1 controller
11 message control unit
12 path control unit
13 topology update unit
14 load control unit
15 network information storage unit
151 path information
152 topology information
153 load control table
2 switch
21 packet control unit
22 message control unit
23 flow table
24 switch ID
25 controller information
251 controller ID
252 hop count
3 terminal
401 CPU
402 memory
403 HDD

The invention claimed is:

1. A controller for controlling some of a plurality of switches in an OpenFlow network, the controller comprising:
    a load control table configured to control at least one of a number of messages which each of the switches in the OpenFlow network has transmitted to a controller controlling the switch over a predetermined time and a number of packets which the switch has received over a predetermined time; and
    a load control unit configured to, when a predetermined event occurs, detect a controller whose processing load should be distributed, on a basis of the load control table and to place at least one of switches controlled by the detected controller under a control of another controller,
    wherein the load control table controls information on a number of communication devices through which packets pass by a packet checked within a controller against a predefined threshold between each of the switches in the OpenFlow network and the controller controlling the switch, and
    wherein the load control unit selects, as the at least one of switches to be placed under the control of the another controller, a switch having a relatively small influence on the processing load and having the number of communication devices through which the packets pass greater than or equal to a threshold.

2. The controller according to claim 1, wherein the processing load includes numerical information whose higher value indicates a higher load, and
wherein the load control unit detects a controller having a processing load higher than or equal to another threshold.

3. The controller according to claim 2, wherein the load control unit selects, as the another controller, a controller having a relatively low processing load.

4. The controller according to claim 2, wherein the load control unit computes the processing load by multiplying the number of messages and the number of received packets.

5. The controller according to claim 1, wherein the predetermined event includes one of a lapse of a predetermined time, addition of a switch to the OpenFlow network, and deletion of a switch from the OpenFlow network.

6. The controller according to claim 1, wherein the load control unit computes a processing load of each controller on a basis of the number of received messages and the number of received packets as well as a number of switches controlled by the controller.

7. The controller according to claim 1, further comprising a topology update unit configured to control information on topology of the OpenFlow network,
wherein, when the predetermined event occurs, the topology update unit detects a controlled switch having a connection failure and eliminates the connection failure of the detected switch before the load control unit performs a process.

8. The controller according to claim 1, wherein the number of communication devices through which the packets pass corresponds to a hop count between the switches in the OpenFlow network and the controller controlling the switch.

9. A method for distributing a load of a controller, the controller controlling some of a plurality of switches in an OpenFlow network, the method comprising:
controlling a load control table including at least one of a number of messages which each of the switches in the OpenFlow network has transmitted to a controller controlling the switch over a predetermined time and a number of packets which the switch has received over a predetermined time; and
a load control of, when a predetermined event occurs, detecting a controller whose processing load should be distributed, on a basis of the load control table and placing at least one of switches controlled by the detected controller under a control of another controller,
wherein the load control table controls information on a number of communication devices through which packets pass by a packet checked within a controller against a predefined threshold between each of the switches in the OpenFlow network and the controller controlling the switch, and
wherein the load control comprises selecting, as the at least one of switches to be placed under the control of the another controller, a switch having a relatively small influence on the processing load and having the number of communication devices through which the packets pass greater than or equal to a threshold.

10. The method according to claim 9, wherein the processing load comprises numerical information whose higher value indicates a higher load, and
wherein the load control comprises detecting a controller having a processing load higher than or equal to another threshold.

11. The method according to claim 10, wherein the load control comprises selecting, as the another controller, a controller having a relatively low processing load.

12. The method according to claim 10, wherein the load control comprises computing the processing load by multiplying the number of messages and the number of received packets.

13. The method according to claim 9, wherein the predetermined event includes one of a lapse of a predetermined time, addition of a switch to the OpenFlow network, and deletion of a switch from the OpenFlow network.

14. The method according to claim 10, wherein the load control comprises computing a processing load of each controller on a basis of the number of received messages and the number of received packets as well as the number of switches controlled by each controller.

15. A non-transitory computer-readable medium storing a program for causing a computer to execute a method for distributing a load of a controller, the controller controlling some of a plurality of switches in an OpenFlow network, the method comprising:
controlling a load control table including at least one of a number of messages which each of the switches in the OpenFlow network has transmitted to a controller controlling the switch over a predetermined time and a number of packets which the switch has received over a predetermined time; and
a load control of, when a predetermined event occurs, detecting a controller whose processing load should be distributed, on a basis of the load control table and placing at least one of switches controlled by the detected controller under a control of another controller,
wherein the load control table controls information on a number of communication devices through which packets pass by a packet checked within a controller against a predefined threshold between each of the switches in the OpenFlow network and the controller controlling the switch, and
wherein the load control comprises selecting, as the at least one of switches to be placed under the control of the another controller, a switch having a relatively small influence on the processing load and having the number of communication devices through which the packets pass greater than or equal to a threshold.

16. The non-transitory computer-readable medium according to claim 15, wherein the processing load comprises numerical information whose higher value indicates a higher load, and
wherein the load control comprises detecting a controller having a processing load higher than or equal to another threshold.

17. The non-transitory computer-readable medium according to claim 16, wherein the load control comprises selecting, as the another controller, a controller having a relatively low processing load.

18. The non-transitory computer-readable medium according to claim 16, wherein the load control comprises computing the processing load by multiplying the number of messages and the number of received packets.

19. The non-transitory computer-readable medium according to claim 15, wherein the predetermined event includes one of a lapse of a predetermined time, addition of a switch to the OpenFlow network, and deletion of a switch from the OpenFlow network.

20. The non-transitory computer-readable medium according to claim 19, wherein the load control comprises, when a switch is added to or deleted from the OpenFlow network as the predetermined event, updating the load control table and subsequently making a comparison with the first threshold.

21. The non-transitory computer-readable medium according to claim 15, wherein the load control comprises computing a processing load of each controller on a basis of the number of received messages and the number of received packets as well as the number of switches controlled by each controller.

22. A computer system, comprising:
a plurality of switches each configured to forward a packet in an OpenFlow network on a basis of a flow table; and
a plurality of controllers each configured to control some of the switches,
wherein each of the controllers comprises:
a load control table configured to control at least one of a number of messages which each of the switches in the OpenFlow network has transmitted to a controller controlling the switch over a predetermined time and a number of packets which the switch has received over a predetermined time; and
load control unit configured to, when a predetermined event occurs, detect a controller whose processing load should be distributed, on a basis of the load control table and to place at least one of switches controlled by the detected controller under a control of another controller,
wherein the load control table controls information on a number of communication devices through which packets pass by a packet checked within a controller against a predefined threshold between each of the switches in the OpenFlow network and the controller controlling the switch, and
wherein the load control unit selects, as the at least one of switches to be placed under the control of the another controller, a switch having a relatively small influence on the processing load and having the number of communication devices through which the packets pass greater than or equal to a threshold.

23. A control device for distributing loads of a plurality of controllers, the controllers controlling switches in an OpenFlow network, the control device comprising:
a load control table configured to control at least one of a number of messages which each of the switches in the OpenFlow network has transmitted to a controller controlling the switch over a predetermined time and a number of packets which the switch has received over a predetermined time; and
load control unit configured to, when a predetermined event occurs, detect a controller whose processing load should be distributed, on a basis of the load control table and to place at least one of switches controlled by the detected controller under a control of another controller,
wherein the load control table controls information on a number of communication devices through which packets pass by a packet checked within a controller against a predefined threshold between each of the switches in the OpenFlow network and the controller controlling the switch, and
wherein the load control unit selects, as the at least one of switches to be placed under the control of the another controller, a switch having a relatively small influence on the processing load and having the number of communication devices through which the packets pass greater than or equal to a threshold.

\* \* \* \* \*